Feb. 6, 1968  C. G. ABERCROMBIE  3,367,060

FISH LURE

Filed May 10, 1965

INVENTOR.
Charles G. Abercrombie
BY
Attorneys

United States Patent Office 3,367,060
Patented Feb. 6, 1968

3,367,060
FISH LURE
Charles G. Abercrombie, Buena Vista Ave.,
Stinson Beach, Calif. 94970
Filed May 10, 1965, Ser. No. 454,437
6 Claims. (Cl. 43—42.33)

ABSTRACT OF THE DISCLOSURE

A body or core of metal is shaped to simulate a bait fish in longitudinal and transverse sections. The body is decorated by randomly disposing highly reflective glitter along the upper surface of the body. The body is then encapsulated in a clear strong polyester, fiberglass filled thick plastic casing which is molded about the lure. Screw eyes are mounted on the body for receiving a hook and line.

---

This invention relates to fish lures of the type simulating a live bait fish and, in particular, to the construction and method of manufacture of such a fish lure.

Heretofore, fish lures resembling a bait fish have been provided with an outer covering of lustrous material to simulate the scales of a bait fish. Such coverings were usually formed as by applying a lustrous paint through a netting to form an interrupted pattern over a continuous opaque or transparent lure body. Such decorations generally conform to the continuous exterior of the lure body and reflect light, if at all, in the manner of a smooth surface. Therefore, the decoration does not accurately depict the surface of a bait fish which, by comparison, glisteningly reflects light in a plurality of directions from each scale. And it has been known to protect the prior art surface decoration by a thin coating of finish such as a lacquer. Such finishes are found to be readily corroded by the elements as by spalling or yellowing after which the fish lure loses much of its decorative effect. There is therefore a need for a new and improved fish lure.

In general, it is an object of the present invention to provide a fish lure which will overcome the above named disadvantages.

Another object of the invention is to provide a fish lure which in action and appearance in water resembles the action and appearance of a live bait fish.

Another object of the invention is to provide a fish lure of the above character which gives the illusion of a bait fish having glistening scales.

Another object of the invention is to provide a fish lure of the above character which is formed of extremely durable materials so that it does not deteriorate from exposure to light or from the action of the elements, including salt water.

Another object of the invention is to provide a fish lure of the above character which is especially adapted for casting.

Another object of the invention is to provide a fish lure of the above character which is exceptionally strong in tension so as to be capable of pulling in large ocean fish.

Another object of the invention is to provide a fish lure of the above character which is exceptionally shock resistant.

Another object of the invention is to provide a fish lure of the above character which has a decorative coating which resembles the scales of a bait fish, and which reflects light in a plurality of directions from each area of the fish lure that is suitably decorated.

Another object of the invention is to provide a method of manufacture for a fish lure of the above character.

These and other objects of the invention will be apparent from consideration of the following detailed description when taken in conjunction with the accompanying drawings in which.

Figure 1:
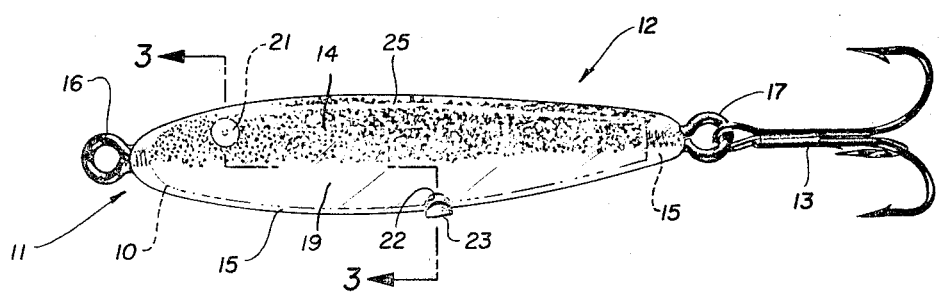
FIGURE 1 is a side elevational view of a fish lure constructed in accordance with the present invention.

Referring now to the drawings, the fish lure constructed according to my invention generally comprises a rigid body 10 simulating a live bait fish and having a head 11 and a tail 12. The body 10 is provided with eye means 16, 17 on the head and tail, respectively, for receiving a hook 13 and a line (not shown). The body 10 is formed of a relatively heavy material such as heavy metal that is distributed along the entire length of the lure. A plurality of glitter particles 14 are glued to the upper portion of the body to simulate the scales of the fish. A special transparent casing 15 is fitted about the body to enclose and support the same.

Figure 2:
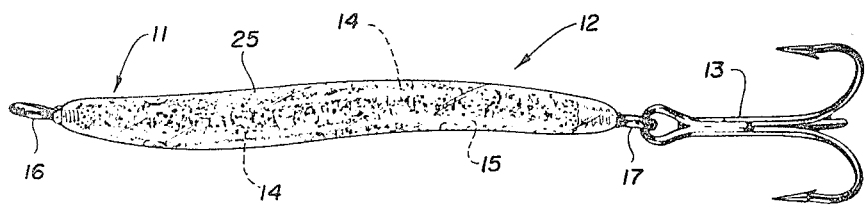
FIGURE 2 is a top plan view of the fish lure shown in FIGURE 1.
Figure 3:
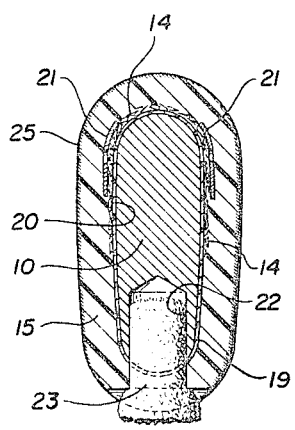
FIGURE 3 is a transverse cross-sectional view taken along the line 3—3 of FIGURE 1.

More particularly, the body 10 is formed of a casting which is generally shaped in an elongated oval in longitudinal cross-section and tapered slightly at tail 12 to generally conform to the shape of a small bait fish. The body 10 in top plan view is slightly curved first in one direction and then in the other in an S shape (FIGURE 2) so that a wiggling motion will be imparted to the fish lure as it is drawn through the water.

In the particular form of the invention shown in the drawings, there is provided a fish lure which is shaped and sized to take the appearance of a small Spanish mackerel bait fish which is approximately 4 inches long, and slightly less than 1 inch high at its midportion, and approximately ½ inch in thickness, and displacing about 18 cc. It has been found that a lure of this general shape is exceptionally effective in casting, such as ocean surf casting, for striped bass and the like. As is known, the weight of the lure is required to be matched to the equipment that will be used to cast it. The description given herein relates to a lure weighing about 3½ ounces and of the dimensions previously stated. For this size and weight of lure, a lead alloy containing about 12% antimony has been found particularly suitable as a material to construct the body 10. However, it will be understood that when constructing a fish of different dimensions and requiring a different weight that the type and/or density of the material utilized to form the body 10 may be changed or adjusted to give the proper weight and size. Within limits, the percentage of antimony in the alloy can be adjusted to provide the desired density. In addition to lightening the alloy to achieve the desired density, the antimony also serves to make the alloy harder and stronger than pure lead.

It is particularly important for surf casting that the center of gravity of the lure be near or at the center of buoyancy thereof so that the fish lure sinks evenly when it hits the water. By this construction, tangling of the line in the fish hooks as the lure sinks is prevented since the lure body extends throughout the length of the lure and is uniform in density in cross-section.

The body 10 is provided with a front screw eye 16 for receiving a line and a rear screw eye 17 for receiving the hook 13. A mold is used to form the metal casting for the body 10, the molten metal alloy being poured.

The body 10 is decorated to achieve a surface appearance which simulates a bait fish. The decorations include a white finish 19 on the lower portion of the body to simulate the belly of the fish, and a plurality of glitter particles 14 randomly disposed over the upper portion of the body 10 and longitudinally thereof to simulate the scales of a fish. The body 10 is given the white finish 19 by coating it with a white pigmented synthetic resin having excellent hiding properties.

A coating 20 of a suitable adhesive is placed along the sides and over the top ¾ of the body 10. Any of the standard adhesives that are resistant to polyester plastic resins, such as vinyl or polyurethane type adhesive, can be used. While the adhesive is still wet, the body 10 is placed in a field of agitated glitter particles 14 until substantially all the upper ¾ of the fish body having the adhesive coating is covered.

The glitter particles 14 are a mixture of silver and colored particles, the latter of which may be green, blue, red, gold, etc. The dimension of the particles is somewhat related to the size of the bait fish being simulated. For the Spanish mackerel type lure, as discussed herein, a glitter particle size of about 1/25 of an inch in diameter is suitable. The glitter particles 14 are made of a material having highly reflective surfaces such as aluminum flecks or flakes.

Two simulated eyes 21 comprising round colored disks of about ¼ inch in diameter are secured to the head portion of the lure body and over the glitter particles with an adhesive. The decorated lure body 10 is then dried out thoroughly.

The decorated lure body 10 is enclosed and supported by a casing 15 which is molded about the entire body in a layer of approximately ⅛–¼ inch in thickness. The casing is transparent to light and exceptionally clear so that the decorated lure body is clearly seen in its detail through the casing.

The casing 15 is constructed so that it is also impervious to and stable in salt water, and non-yellowing under exposure to light, and particularly to ultraviolet. It is shock resistant, rigid, and has sufficient strength to cooperate with the body 10 to firmly grip the screw eyes 16 and 17 when the lure is loaded in tension, as when pulling in a large fish. The casing also has the property that it is resistant to checking or dulling and thus retains its appearance exceptionally well, as well as sealing the body 10 from the direct corrosive action of the elements.

The casing 15 consists of a pastic material which is loaded with approximately 20% by volume of glass fiber filler in the form of strands approximately 1/32–1/16 of an inch long. Preferably, the plastic is a polyester resin composed of the following materials:

1 part of Pittsburgh Plate Resin #5208
2 parts of Archer Daniel Resin #7410
7 parts of Allied Chemical Resin #6900

The above ingredients are mixed together in the proportions indicated with 2% by volume of methyl methylacrylate monomer to impart clarity to the plastic, and a 2% by volume diallylphathalate monomer for strength. A 1% by weight of a mixture formed of 1 part of ⅓ 6% cobalt naphthanate solution and ⅔ parts styrene monomer mixed with 5 parts of a color free promoter are added to the previous ingredients together with glass fiber, and all are thoroughly mixed. The filled resin is then catalyzed with standard 190 MEKP.

The lure body 10 is supported in a mold on the hook eyes 16 and 17 which extend longitudinally away from the body, the threads of the eyes lying partly in the body and partly in the region to be occupied by the casing 15. The casing material is then poured about the body 10 and cured for one hour at 200° F., after which the mold is removed from the heat and cooled for about one hour to effect an intermediate cure. The lure is then removed from the mold, trimmed, given a final thin coating 25 of clear synthetic resin of a type which is resistant to the action of chemicals. Thus, the exterior is provided with an exceptionally smooth finish to thereby enhance and maintain the exceptionally clear character of the casing 15. Thereafter, the casing 15 and coating 25 are cured to complete polymerization.

A small diameter hole 22 is drilled in the lower portion of the lure and intermediate its ends for receiving a wick 23 adapted to retain suitable fish attracting liquid.

From the above description, it will be apparent that my new fish lure is very resistant to all forms of corrosion and breakage, and will retain its appearance for a long time under average conditions. The decorative effect of the random application of glitter particles, clearly visible through the casing, is especially effective, scattering incoming light in a plurality of directions so that it can be easily seen by fish in all directions from the lure.

My novel lure is especially adapted for casting, it is rigid and compact and thus is not appreciably affected by wind. It is balanced so that when it strikes the water, it sinks evenly, thus preventing entanglement of the line and hook as occurs with unbalanced lures.

The above-mentioned decorative effect is maintained by the exceptionally clear character of the casing and its surface coating. The latter, it is noted, is applied before complete polymerization of the casing has taken place, so that the coating resin polymerizes not only with itself but also with the polymer chains of the casing material. This bond is to be distinguished from a paint-like or adhesive coating bond which is subject to chipping or peeling. The bond between the thin outer coating and the casing, as constructed in accordance with the present invention, provides a lustrous glass-like finish which is generally not obtainable with this type of molded plastic article.

I claim:

1. A fish lure especially adapted for casting comprising an elongate solid pigmented body simulating a bait fish and having head and tail portions, means mounted at the head portion for receiving a line and means mounted on the body for receiving a fish hook, said body being formed solely of a heavy rigid material having dimensions in transverse cross section and length conforming to that of the bait fish being simulated, a plurality of glitter flake particles disposed on the upper portion of the body and distributed longitudinally therealong in randomly oriented positions to simulate the reflections of the scales of the bait fish, and a thick transparent plastic casing enclosing and sealing said body and the glitter particles thereon, said casing formed and polymerized about the body and glitter particles so that the reflective surfaces of the glitter particles are in intimate contact with the inside of the casing, said casing serving to protect the body from shock and abrasion.

2. A fish lure as in claim 1 in which said glitter flake particles are highly reflective metal flecks.

3. A fish lure as in claim 1 in which said material is a metal alloy selected so that the fish lure has a density of about 4–5 grams per cc.

4. A fish lure as in claim 1 constructed with substantially uniform density along its length so that the lure sinks evenly in water.

5. A fish lure as in claim 1 in which said casing is constructed of light, clear composition of fiberglass dispersed in polyester resins.

6. A fish lure as in claim 1 wherein said body and casing are formed in a slight reverse curve.

References Cited

UNITED STATES PATENTS

| | | | |
|---|---|---|---|
| 1,323,458 | 12/1919 | Dills | 43—42.33 |
| 1,772,058 | 8/1930 | Welch | 43—42.33 |
| 2,587,264 | 2/1952 | Wood | 43—42.33 |
| 2,657,495 | 11/1953 | Eppinger | 43—42.33 |
| 3,072,973 | 1/1963 | Barnette | 264—271 X |

SAMUEL KOREN, *Primary Examiner.*

D. J. LEACH, *Assistant Examiner.*